Aug. 25, 1953 P. D. NEWHOUSE 2,650,290
CONVEYER SYSTEM FOR INDUCTION HEATING
Filed Sept. 20, 1949 2 Sheets-Sheet 1

INVENTOR
Paul D. Newhouse.
BY
B. L. Zangwill
ATTORNEY

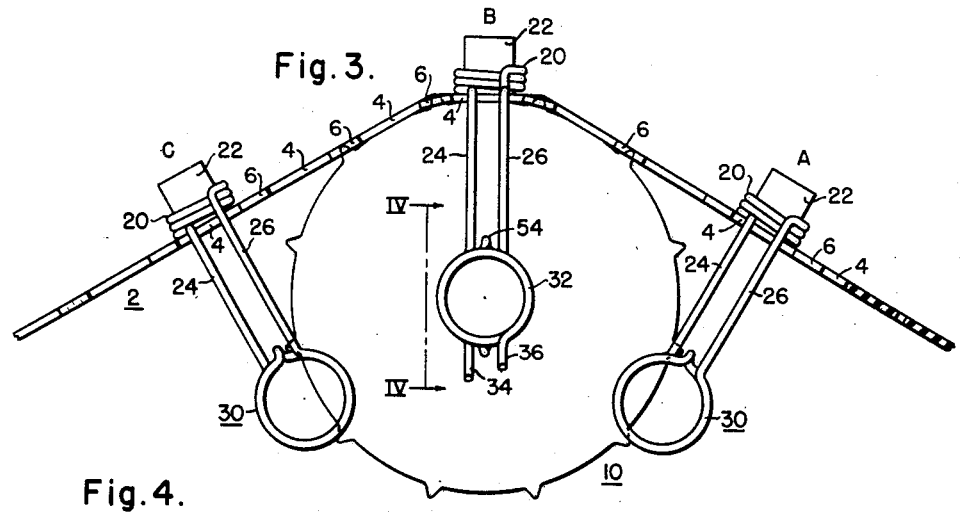
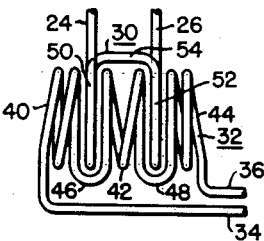
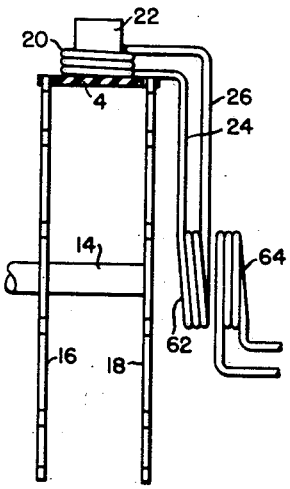
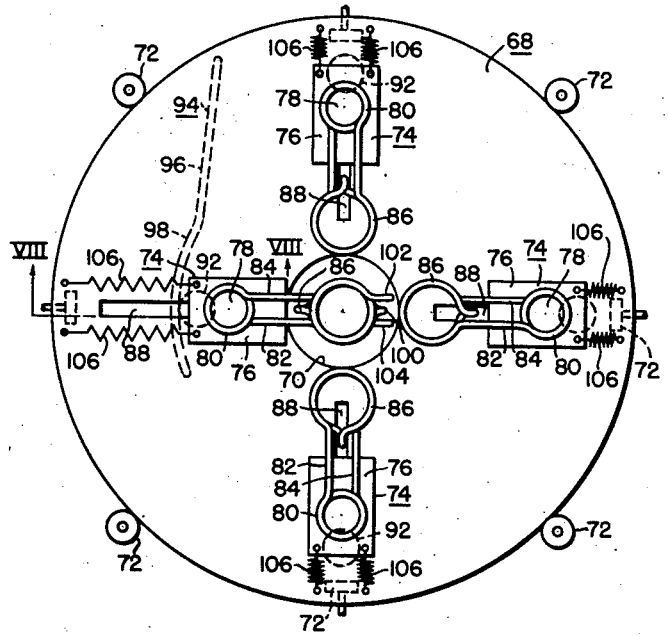
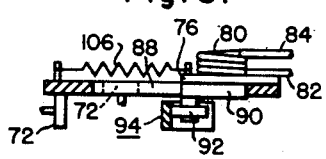
INVENTOR
Paul D. Newhouse.

Patented Aug. 25, 1953

2,650,290

UNITED STATES PATENT OFFICE 2,650,290

CONVEYER SYSTEM FOR INDUCTION HEATING

Paul D. Newhouse, Salix, Iowa, assignor to Westinghouse Electric Corporation, East Pittsburgh, Pa., a corporation of Pennsylvania Application September 20, 1949, Serial No. 116,698

12 Claims. (Cl. 219—47)

Broadly, my invention relates to the induction heating of a plurality of discrete or separate work-units on a continuous or mass-production basis; and more particularly my invention seeks to improve the efficiency with which work can be inductively heat-treated while carried on a conveyor.

It has been suggested that a plurality of workpieces be inductively heated in succession by providing a conveyor which moves the workpieces successively through a stationary open-ended channel-type inductor positioned along the path of the conveyor. A system of this kind is shown, for example, in the Bailey Patent No. 2,052,010 of August 25, 1936, and in the Goodridge Reissue Patent No. 22,322 of May 25, 1943. Such schemes have limited use because the magnetic coupling between each workpiece and the inductor is exceptionally loose, so that it is usually extremely difficult to heat irregularly shaped parts with efficiency or to obtain a high degree of localized heating. In order to obtain better coupling and more efficient transfer of energy, it has been proposed that a stationary inductor be shaped to the workpiece, and that the workpiece be temporarily moved into the inductor from a conveyor and then back to the conveyor. Such a scheme requires intermittent driving apparatus and reciprocating apparatus.

A primary object of my invention is to provide an induction heating system of a type described which lacks the foregoing disadvantages, and instead has an inductor for each workpiece on the conveyor. Each inductor moves with the conveyor, so that it can be designed or shaped to fit the workpiece to be associated with it. Each inductor is supplied with high frequency energy by an associated coupling coil movable with the conveyor. Timing of the heating is obtained by controlling the period of energization of each coupling coil preferably but not necessarily, without breaking of circuits.

In accordance with a specific form of my invention, a conveyor in the form of an endless belt is provided with a plurality of spaced heating means. Each heating means comprises a heating station which has a seat designed to receive a workpiece that is to be inductively heat treated. Each heating means also comprises an inductor at the seat, and a distinct coupling coil to which the inductor is connected. The coupling coils of the different heating means are supported, either directly or indirectly, by the conveyor so that they move therewith. As each coupling coil moves, it passes a predetermined spot where it temporarily closely magnetically couples a stationary primary coil which is energized with high frequency energy. Consequently, the coupling coil and the primary coil form a current transformer for the time during which the two coils are physically in close proximity. During this time, the coupling coil acts as a secondary coil of an energized transformer, and supplies high frequency power to the associated inductor for heating the associated workpiece. Preferably, the path in which the conveyor moves is given a geometric pattern such that the movable coupling coils successively remain in closely coupled relation to the stationary primary coil for a preset time. Preferably, also, the primary coil and each of the coupling coils are constructed for highly efficient transfer of energy therebetween.

Further objects, features, and innovations of my invention will be discernible from the following description of preferred embodiments. The description is to be taken in connection with the accompanying schematic drawings which are not to scale. In the drawings only such parts are shown as is believed necessary for the understanding of the invention, details being omitted in the interest of clarity and brevity. In the drawings:

Fig. 3 is an elevational view of parts shown in Fig. 2;

Fig. 4 is a sectional view on line IV—IV of Fig. 3;

Fig. 6 is a vertical sectional view through a conveyor of a modified form of my invention;

Fig. 7 is a plan view of a modified form of my invention, utilizing a turntable as a conveyor;

Fig. 8 is a vertical sectional view of the part shown in Fig. 7; and

Figure 1:
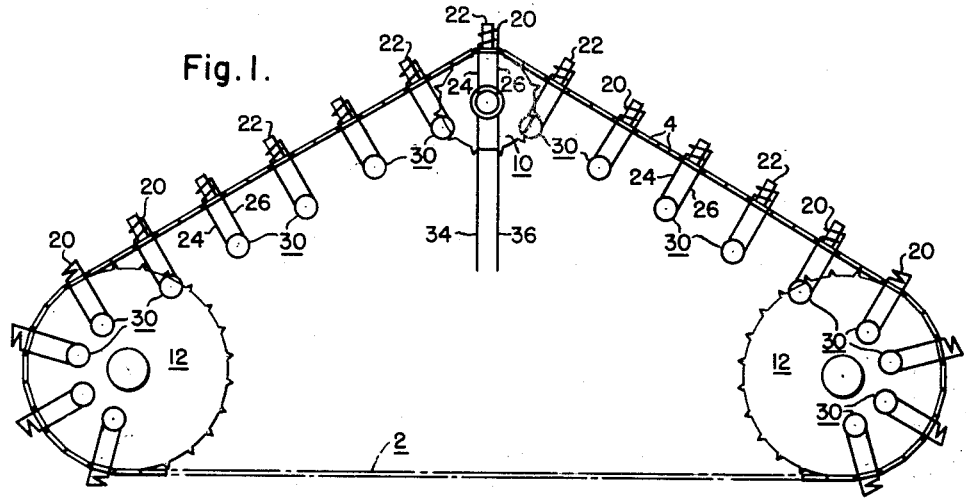
Figure 1 is a schematic elevational view of an induction heating conveyor system embodying my invention.

Referring to Figs. 1–6, an endless conveyor 2 is provided which comprises a plurality of similar rectangular slats 4. The corners of consecutive slats are pivotally connected by links 6; and the corner portions of the slats are cut away to provide holes 8. Accordingly, a chain conveyor of the slat type is formed having a plurality of evenly spaced holes at each side. The conveyor passes around a plurality of sprocket-wheel assemblies 10 and 12 having lugs which pass into the holes 8. One of these sprocket-wheel assemblies may be a driving means driven by an electrically controlled driving means in any suitable manner. The various sprocket-wheel assemblies are arranged so as to make the conveyor 2 advance on, engage and recede from the upper sprocket-wheel assembly 10 in a path which is concave toward the center or axis of this assembly 10. The upper sprocket-wheel assembly 10, around which the conveyor 2 is partially wrapped, comprises a rotatable shaft 14 to which a pair of spaced conveyor-engaging sprocket-wheels 16 and 18 are fixed.

The conveyor 2 carries a plurality of spaced heating means, each of which comprises one or more heating stations. In the embodiment being described, for simplicity, each heating means comprises a single heating station on every third slat 4. Consequently a plurality of slats separates the centers of consecutive heating stations.

Each heating station comprises a work-holding seat in the associated slat 4, a high-frequency work-heater thereat in the form of an inductor 20, and means for conveying electrical energy to the high-frequency work-heater. Each seat comprises means which holds a piece of work 22 to be heat treated. In accordance with my invention, the workpiece 22 is heated by high-frequency energy supplied to the high-frequency work-heater. For induction heating the workpiece 22 is metallic and, for simplicity, is shown as a short round rod. For receiving such workpieces, each work-receiving seat may comprise a circular indentation in the associated slat and any suitable means that will keep the work properly seated therein. In cases where workpieces, instead of being single short round rods, are of a more complicated shape of one or more pieces, the seat can comprise a work-retaining fixture. The term, seat, is accordingly, intended to embrace any work-receiving and holding means associated with a heating station on the conveyor.

Each inductor 20 may comprise one or more turns shaped to suit the work being heat-treated. In the embodiments shown, the inductor turns are only slightly larger than the cylindrical workpiece 22, so that it closely couples the workpiece and can efficiently transfer energy thereto.

Each heating means, comprising a heating station, becomes energized as it passes along a path at the top of the sprocket-wheel asesmbly 10. To this end, each inductor merges into or is connected to conductors 24 and 26 for each heating means. These conductors are bent downwardly around the associated slat and extend parallelly downwardly to a member adapted to supply high-frequency energy to the circuit formed by the conductors. In the preferred embodiment for induction heating, this member comprises an associated coupling coil 30. The conductors 24 and 26 interconnect the associated inductor and coupling coil to form a closed circuit. Consequently in the specific form of my invention herein described, each heating means comprises a work-holding seat, a work-heating inductor associated with said seat, an energy-transferring coupling coil for energizing the inductor, and circuit means for connecting the coupling coil and the associated inductor in a closed circuit, and through which electric energy can pass from the coupling coil to the inductor. More broadly stated, each heating means comprises a work-holding seat, a high-frequency work-heater associated with said seat, and an energy-transferring means for supplying high-frequency energy to said high-frequency work-heater, the energy-transferring means comprising an energy-transferring member which is connected to the work-heater by a circuit means.

The lengths and disposition of the conductors 24 and 26 are such that the center of each coupling coil passes across or at least near the axis of the upper sprocket-wheel assembly 10. It is to be noted that in the embodiment being described the axis of each coupling coil and its associated inductor are spaced from each other, and in the embodiment shown actually lie in perpendicular planes.

As the conveyor 2 moves, it carries the various heating means thereon with it. The heating stations of the heating means move along a first endless path which includes the slats, but the coupling coils move in a different path which lies within the first path. Arranged along a side of the path in which the coupling coils move, and coaxial with the upper sprocket-wheel assembly 10, is a stationary primary winding or coil 32. The primary coil 32 is provided with a pair of conductors 34 and 36 to which a source of high frequency energy, such as a tube oscillator generator or a rotating machine alternator, may be connected in any suitable manner.

As the conveyor operates, the coupling coils are successively closely coupled to the primary coil 32 to form, in effect, a transformer. Consequently, the primary coil 32 is a stationary energy-transfer member and each coupling coil 30 is a movable energy-transfer member that forms an energy-transferring means with the coil 32 when the coil 30 moves into coupling relation with the coil 32.

The time during which each coupling coil 30 is coupled to the primary coil 32 depends generally upon the length of the arc or concave portion of the sprocket-wheel assembly 10 which is engaged by the conveyor 2, and the time it takes for a heating station to traverse this arc.

As illustrated in Fig. 3, a heating station of a first heating means at A is approaching the sprocket-wheel assembly 10, a heating station of a second heating means at B is at the sprocket-wheel assembly, and a heating station of a third heating means at C has left the sprocket-wheel assembly. As each heating means approaches the sprocket-wheel assembly 10, it moves its coupling coil 30 into coupling relation to the primary coil 32 until the coupling coil is substantially coaxial with the primary coil 32. The two coils thus form an effective two-member energy-transferring means, the two members facing each other along planes perpendicular to their common axis. Further movement of the heating means, while at the sprocket-wheel assembly, will twist the coupling coil substantially about its axis, so that the coupling coil remains closely coupled to the primary coil 32. When the heating means leaves the sprocket-wheel assembly 10, the coupling coil moves out of its coupling relation with the primary coil. During the time the coupling between the primary coil and a coupling coil is close or at a maximum, high-frequency energy is induced in such coupling coil. This energy passes to the associated inductor by way of the associated conductors 24 and 26, and the associated workpiece is heat-treated.

Summarizing the operation of the apparatus thus far described, the conveyor 2 has a plurality of sections, each of which comprises a heating means. Each heating means has a heating station which is loaded with work at some location well before the sprocket-wheel assembly 10. Each loaded heating station moves substantially rectilinearly as it approaches a sprocket-wheel assembly 10, until it reaches a point where its conveyor-section begins to operatively engage the sprocket-wheel assembly. The portion of the conveyor section on the sprocket-wheel assembly 10 is part of a circular arc having an axis at the center of the stationary energy-transfer member or primary coil 32. As a conveyor-section begins to move along this arc-portion, the associated movable energy-transfer member 30 begins to move into coupling relation with the stationary energy-transfer member 32. Thereafter, the aforesaid conveyor section is in operative engagement with the sprocket-wheel assembly 10, and the associated energy-transfer member is coupled to the stationary energy-transfer member. The two energy-transfer members remain in this closely coupled relation, forming a compact energy-transferring means, and the associated workpiece is heated until the associated conveyor-section leaves the sprocket-wheel assembly 10, and the two energy-transfer members separate. Thereafter, the associated workpiece can be removed at some subsequent point.

In the specific embodiment being described, it is desirable to space the conveyor-sections that carry the respective heating means so that one coupling coil starts to leave the primary coil as another is about to enter it. In this way, a conveyor system of maximum capacity can be obtained A workpiece will be heated for the time-period during which the associated conveyor section is operatively engaged with the sprocket-wheel assembly 10, and the associated coupling coil 30 is closely coupled to the primary coil 32. Such time can be predetermined by the speed and manner in which the conveyor moves. Assuming that the conveyor moves continuously at a constant speed, the time-period will depend on the length and shape of the concave portion along which each heating means must pass in order to operatively engage the sprocket-wheel assembly 10 for causing its coupling coil to couple the primary coil. The time-period can be increased by having the conveyor move intermittently, step-by-step, with the length of each step being such as to place the heating stations successively at the heating point B. The heating time-period for each workpiece will then be increased by the time that the heating station is stopped at this point. This stopping interval can be controlled in any suitable way.

Figure 2:
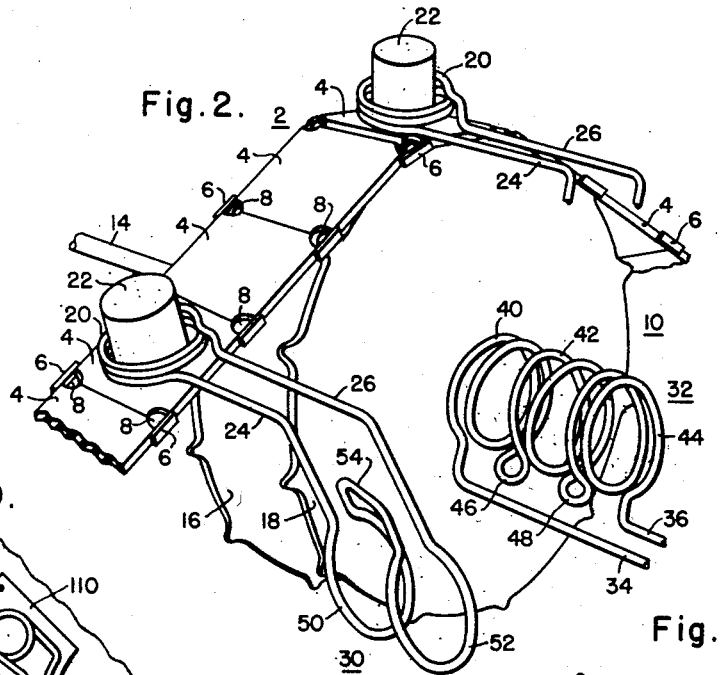
Fig. 2 is a perspective view of a part of the conveyor system of Fig. 1.

For obtaining efficient coupling between each coupling coil and the primary coil, I have found it desirable to wind and arrange the coils in a manner evident from Figs. 2 and 4.

The primary coil 32 comprises a plurality of turn-sections, arbitrarily shown as three turn-sections 40, 42 and 44. Each turn-section consists of one or more complete conductor-turns. The turn-sections are spaced and interconnected by conductor-portions 46 and 48. All of these conductor-portions lie at the bottom side of the primary winding so that they will not interfere with linear movement of the coupling coils in their endless path, or twisting movement of each coupling coil while coupled to the primary winding.

Each coupling coil 30 also comprises one or a plurality of turn-sections of any desired number of conductor-turns. In the embodiment shown, two turn-sections 50 and 52 are provided, each of a single conductor-turn. The turn-sections of each secondary coupling coil are interconnected by a conductor-portion 54 at a side of the coupling coil which is opposite to the primary conductor-portions 46 and 48. The secondary turn-sections 50 and 52 are spaced a distance apart which will enable them to pass freely through the spaces provided between the spaced turn-sections 40, 42 and 44 of the primary coil.

Figure 5:
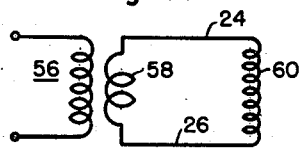
Fig. 5 is the equivalent circuit diagram of a heating station and its coupling coil when the coupling coil is closely coupled to the primary coil.

The equivalent circuit of a heating means and primary coil is shown in simple form in Fig. 5. Winding 56 represents the primary coil which can be connected to any suitable source of high frequency. Winding 58 represents any secondary coil when it is closely coupled to the primary coil. Winding 60 represents the inductor 20 that is associated with the aforesaid secondary coil. The associated windings 58 and 60 are made part of a circuit means which includes the interconnecting conductors 24 and 26.

In the event that the added refinement attained by designing the primary and secondary coil with spaced turn-sections is not necessary, the coils can be designed in a more simple manner, as shown in Fig. 6, wherein conductors 24 and 26 terminate at a coupling coil 62 which consists of a single turn-section of as many compact insulated turns as desired. The primary coil 64 also consists of a single turn-section. The two coils are arranged so that their ends face each other during the time the coupling coil passes along the part of the path of movement in which it lines up with the primary coil.

The principles of my invention can be extended to other suitable conveyors. A conveyor of the turntable type embodying my invention is illustrated in Figs. 7 and 8. Referring to these figures, an annular turntable 68 having a central hole 70 is supported and rotated in any suitable manner; a supporting and driving means being represented by a plurality of rollers 72, along the edge and the bottom of the turntable. The turntable carries a plurality of spaced heating means 74. Each heating means comprises a radially slidable turntable-segment 76 having a work-holding seat 78 and carrying an inductor coil 80 fed by conductors 82 and 84 which are connected to a coupling coil 86.

Each segment 76 of each heating means lies over a radial slot 88 in the turntable, and has a depending guide-bar 90 and a roller 92 below the turntable adapted to engage a stationary cam 94. The cam comprises an approach-portion 96, and a small circular operating arc-portion 98 which has the same center as the turntable. Assuming that the turntable moves counterclockwise with respect to Fig. 7, when a roller 92 engages the approach-portion 96 of the stationary cam 94, the roller moves the associated segment 76 radially inward, until its coupling coil 86 is coaxial with the annular turntable 68.

A primary coil 100, energized by conductors 102 and 104, is provided in the central hole 70 of the turntable co-axial therewith. The coupling coil 86 becomes closely magnetically coupled to the primary coil 100 when it is moved into the hole 70 of the turntable and remains so coupled to the primary coil as the roller 92 moves on the arc-portion 98. When the roller 92 leaves the cam 94, springs 106 return the segment to its original position where its associated coupling coil is out of line with the center hole 70 of the turntable 68. The next successive heating means then approaches the stationary cam 94, and is moved to a position in which a workpiece in its seat 78 will be heated in an obvious manner. Consequently, the coupling coils 86 of the different heating means are successively closely coupled to the stationary primary coil 100.

Each heating means on the conveyor may have its coupling coil connected to an inductor capable of heating a plurality of workpieces, instead of a single workpiece. This modification is shown in Fig. 9 as applied to the annular turntable 103, although it is obviously also applicable to the belt-conveyor of Figs. 1–6.

Figure 9:
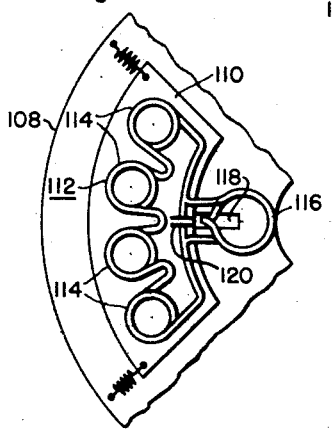
Fig. 9 is a partial plan view illustrating a modified form of inductor.

In Fig. 9 an arcuate turntable-segment 110 is provided carrying an inductor 112 provided with a plurality of series-connected turn-sections 114, each of which is adapted to heat a workpiece therein, as is known to the art. The inductor is connected to a single coupling coil 116 which is radially movable with the segment 110 when the segment rides in its associated slot 118, so that the coupling coil moves into and out of coupling relation to a stationary primary in the manner described in connection with Figs. 7 and 8.

A capacitor may be inserted in the circuit means of each heating means in order to increase the current in the inductor. The capacitor may be connected in series or in parallel. Fig. 9 also shows such a capacitor 120, across an inductor, and a similar expedient can be applied to other embodiments.

While I have described my invention in forms that I now prefer, it is obvious that principles thereof can find expressions in other modifications and embodiments.

I claim as my invention:

1. High-frequency heating means of a type described comprising, a heating station comprising a work-holding seat and a high-frequency work-heater at said seat, a first coil spaced from said high-frequency work-heater, means comprising a conductor for connecting said first coil and high-frequency work-heater in an electric circuit, a second coil, means for moving said first coil relatively with respect to the second coil, said moving means moving said high-frequency work-heater in a pre-set path, said second coil being arranged alongside said path for magnetically coupling said first coil, as the high-frequency work-heater moves along a predetermined portion of said path, said first and second coils remaining in a substantially unchanging magnetic coupling as said high-frequency work-heater moves along said predetermined portion of said path, said second coil being adapted to be energized with high frequency energy.

2. An invention including that of claim 1 but characterized further by one of said coils comprising a turn-winding having a plurality of spaced turn-sections providing a plurality of spaced spaces, and by the other of said coils comprising a turn-winding having a turn-section, said turn-sections of said coils being interleaved during movement of said first coil along a portion only of said pre-set path.

3. Induction heating means of a type described comprising in combination, a movable means movable along a pre-set path including a fractional portion which is substantially a circular arc centered upon a fixed axis, said movable means comprising a work-holding seat and a work-heating inductor associated therewith, a separate coupling coil, circuit-means, comprising conductor-means, connecting said coil and inductor in a closed electric circuit, said coupling coil being constructed and arranged to move with said movable means and with its axis substantially coinciding with said fixed axis when said movable means is on said portion of said path, a stationary primary coil arranged with its axis substantially coinciding with said fixed axis, said primary coil being arranged so that said coupling coil is coaxial therewith while said movable means is on said portion of said path.

4. An invention including that of claim 3, but further characterized by having a driving means for said movable means, operable for intermittently moving said movable means, with a stopping interval while the movable means is on said portion of said path and said coils are substantially coaxial.

5. High-frequency heating means of a type described comprising, a heating station comprising a work-holding seat and a high-frequency work-heater associated therewith adapted to heat work in said seat, circuit means comprising a coupling coil separate from said high-frequency work-heater but connected thereto for feeding high-frequency energy to said high-frequency work-heater, said coupling coil comprising a winding having an axis, a carrier movably carrying said heating station and said circuit means along a pre-set path having a concave portion, a stationary primary coil comprising a winding having an axis, said winding being alongside said concave path-portion and arranged so that the axes of said windings become substantially in line during operation of said carrier, whereby said coils are magnetically coupled.

6. High-frequency heating means of a type described comprising a conveyor movable in a path including a substantially circular arc-portion having a substantially fixed axis, a stationary energy-transfer member at said axis, said conveyor comprising a plurality of heating means spaced therealong, each heating means comprising a work-heater and a movable energy-transfer member movable to said axis, said conveyor supporting said plurality of heating means so that each movable energy-transfer member successively couples to said stationary energy-transfer member, and remains in substantially fixed coupled relation therewith while its associated work-heater passes along said arc-portion.

7. Induction heating apparatus of a type described comprising a movable endless belt; belt positioning means comprising a gear the periphery of which engages a part only of said conveyor along a substantially circular arc having a central axis; a stationary primary coil located substantially at said axis; said belt carrying a plurality of spaced heating means; each heating means comprising a heating station having a work-holding seat and an inductor coil having an axis, a coupling coil having an axis different from that of said inductor coil and out of line therewith, and circuit-completing means between said coupling coil and the associated inductor coil; said belt carrying said coupling coils so that they successively pass said primary coil, with their axes successively substantially in line with that of said primary coil.

8. An invention including that of claim 7 but characterized by the axis of each inductor coil being substantially perpendicular to that of its associated coupling coil, and by the axis of said primary coil being substantially in line with that of said circular arc.

9. An invention including that of claim 1, in which the means for moving said first coil includes a turntable having an axis and being adapted to rotate about said axis, said turntable carrying at least one of said heating stations, with the second coil having an axis which is substantially coincident to the axis of the turntable, and means for successively and radially moving said first coil into and out of coupling relation to said second coil.

10. An invention including that of claim 9, in which there is provided cam means for radially moving said first coil into coupling relation with said second coil and maintaining such coupling relation for a predetermined time interval, and finally moving said first coil out of coupling relation to said second coil.

11. High-frequency heating means of a type described comprising, in combination, a conveyor movable along a predetermined path including a substantially circular arc-portion having a substantially fixed axis, a stationary energy-transfer member at said axis, high-frequency-supply conductor-means connected to said stationary energy-transfer member, said conveyor comprising a plurality of heating means spaced therealong, each heating means comprising a work-holding seat, a high-frequency work-heater at said seat, an energy-transfer member and an electrical connection between said high-frequency work-heater and energy-transfer member, means to move said conveyor for successively moving each of said heating means along said arc-portion so as to place the associated energy-transfer member in a position at said axis and facing said stationary energy-transfer member, said members facing each other in planes generally perpendicular to said axis.

12. High-frequency heating means of a type described comprising, in combination, a conveyor movable along a predetermined path including a curved portion which is concave inward, a stationary energy-transfer member lying inside said concave portion, means for energizing said stationary energy-transfer member with high-frequency energy, said conveyor comprising a plurality of heating means spaced therealong, each heating means comprising a work-holding seat, a high-frequency work-heater at said seat, a movable energy-transfer member arranged on said conveyor so as to pass on the concave side of said concave portion, and electrical circuit means between said high-frequency work-heater and movable energy-transfer member, and means operable when a heating means is at said curved portion to move the associated movable energy-transfer member to a position in coupling relation and facing said stationary energy-transfer member, said energy-transfer members facing each other in planes substantially perpendicular to a plane including said concave portion.

PAUL D. NEWHOUSE.

References Cited in the file of this patent

UNITED STATES PATENTS

| Number | Name | Date |
| --- | --- | --- |
| 1,831,530 | Spire | Sept. 1, 1931 |
| 1,911,046 | Wright | May 23, 1933 |
| 2,109,323 | Smith | Feb. 22, 1938 |
| 2,321,189 | Dravneek | June 8, 1943 |
| 2,403,800 | Hoyler | July 9, 1946 |
| 2,456,962 | Lee | Dec. 21, 1948 |
| 2,476,935 | Wharff | July 19, 1949 |
| 2,504,815 | Detuno et al. | Apr. 18, 1950 |
| 2,506,425 | Journeaux | May 2, 1950 |

FOREIGN PATENTS

| Number | Country | Date |
| --- | --- | --- |
| 598,926 | Great Britain | Mar. 1, 1948 |